J. C. WALLACE.
Crucible-Mold.

No. 162,325. Patented April 20, 1875.

UNITED STATES PATENT OFFICE.

JAMES C. WALLACE, OF PITTSBURG, PENNSYLVANIA.

IMPROVEMENT IN CRUCIBLE-MOLDS.

Specification forming part of Letters Patent No. 162,325, dated April 20, 1875; application filed March 19, 1875.

*To all whom it may concern:*

Be it known that I, JAMES C. WALLACE, of Pittsburg, county of Allegheny, State of Pennsylvania, have invented or discovered a new and useful Improvement in Crucible-Molds; and I do hereby declare the following to be a full, clear, concise, and exact description thereof, reference being had to the accompanying drawing making a part of this specification, in which—like letters indicating like parts—

Figure 1:
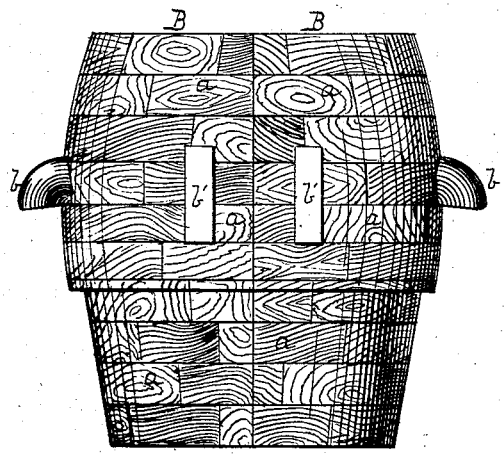
Figure 2:
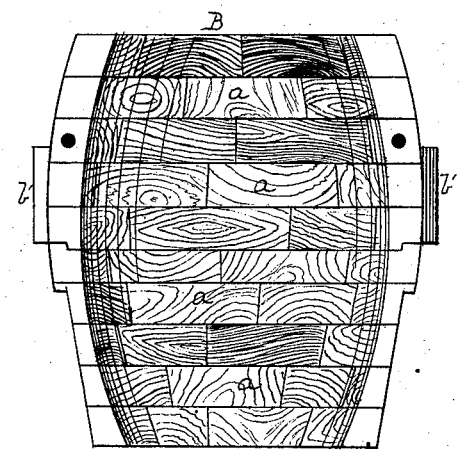

Figure 1 is a side elevation of my improved mold; and Fig. 2 shows, in elevation, the inner face of one-half or section of the mold.

Heretofore in molding plumbago crucibles, designed for use in the melting of metals, metallic alloys, and compounds, plaster molds have commonly been employed. But numerous and serious difficulties have been experienced in this connection. First, the plumbago mixture is so plastic and pliable when freshly molded, and adheres to the mold with such tenacity, as practically to render it necessary to let the crucible stand in the mold about twenty-four hours, more or less, till it acquires, by drying, such a degree of rigidity as not to be broken, bent, or warped by the removal of the mold. Hence the number of plaster molds required in a crucible-works must equal its actual running capacity during the number of hours required in so drying the crucibles; and, second, the molds themselves, when molded, being of plastic material, are apt to become warped or distorted, and so spoiled, before being thoroughly hardened, and, while being used, pieces chip or splinter off the faces or edges, so that they will no longer mold a perfect article; also, third, the plaster-molds sometimes become softened by the moisture absorbed from the plumbago mixture, so as, when revolved rapidly in the molding-machine, to break or burst under centrifugal action. By my improvement I overcome almost entirely the adhesiveness of the freshly-molded crucible to its mold, by moistening the molding-face of the mold, and sprinkling thereon a slight layer of plumbago dust preparatory to molding each crucible; and I further promote the same end by making the mold of wood instead of plaster. And in order that such wooden mold shall not only deliver readily, but also be free from danger of warping, or otherwise becoming distorted, I build up the mold of comparatively small blocks of thoroughly-seasoned wood, and then, by the operation of turning, bring it to the exact form desired, which form it will retain in all circumstances of ordinary use without warping, becoming notched, or otherwise acquiring an imperfect face. Such a wooden mold may also receive a more perfectly finished face than can be attained in a plaster mold, and the readiness with which it will deliver is such that the crucibles can, with care, be removed from the molds as fast as molded, so that a single molding-machine may be run to its fullest capacity with only two molds, instead of a number equal to the number of crucibles made in twenty-four hours. Also, such wooden molds are not liable to the danger of breaking by centrifugal force when being used on the machine in the molding of crucibles.

The mold B is made in two or more parts or sections, and is provided with the usual handles $b$ for lifting it, and lugs $b'$, or other equivalent device, for separating the sections, which latter, when in use, are banded or otherwise fastened together. Each section is built up, like a stone wall, of wooden blocks or strips $a$ of comparatively small size, thoroughly seasoned, accurately fitted, and permanently fastened together by screws, nails, or dowels, the joints being luted with suitable material, such as glue, white lead, &c. The section is then turned to the exact form desired, and the face smoothed and finished in any suitable manner known in wood-working. Thus made, it can be made more perfectly true than a plaster mold can be made, with a better and more permanent face, will deliver better, and cannot warp, twist, or otherwise lose its shape. But the ready delivery of freshly-molded crucibles, generally, can be greatly promoted by moistening (if not already in that condition) the inner face of the mold, just before each crucible is molded, with common water or plumbago-water, and sprinkling thereon a layer or dusting of fine plumbago dust. And this mode of preparing crucible-molds I include herein as a part of the present invention. But, after each crucible is removed from the mold, the plumbago adhering to the inner face of the mold should be removed before applying freshly the plumbago dust, and this is preferably done by wiping it out, instead of scraping, so as not to injure the working-face of the mold.

What I claim as my invention, and desire to secure by Letters Patent, is—

1. The mode of preparing crucible molds for use in molding, by sprinkling a light layer of plumbago dust on the moistened molding-face of the mold, substantially as and for the purposes set forth.

2. A wooden crucible-mold, built up of small pieces, substantially as set forth.

In testimony whereof, I have hereunto set my hand.

JAMES C. WALLACE.

Witnesses:
JAMES M. CHRISTY,
GEORGE H. CHRISTY.